US012058483B2

(12) United States Patent
Shibakusa et al.

(10) Patent No.: US 12,058,483 B2
(45) **Date of Patent: *Aug. 6, 2024**

(54) SPEAKER GRILL AND SPEAKER DEVICE

(71) Applicant: Yamaha Corporation, Hamamatsu (JP)

(72) Inventors: Hiroyuki Shibakusa, Hamamatsu (JP); Kazunori Tanaka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 147 days.

This patent is subject to a terminal disclaimer.

(21) Appl. No.: 17/555,368

(22) Filed: Dec. 17, 2021

(65) Prior Publication Data

US 2023/0199351 A1 Jun. 22, 2023

Related U.S. Application Data

(63) Continuation of application No. 17/125,421, filed on Dec. 17, 2020, now Pat. No. 11,240,575.

(30) Foreign Application Priority Data

Dec. 26, 2019 (JP) ................................ 2019-236813

(51) Int. Cl.
*H04R 1/02* (2006.01)

(52) U.S. Cl.
CPC ............ *H04R 1/023* (2013.01); *H04R 1/026* (2013.01)

(58) Field of Classification Search
CPC ................................ H04R 1/023; H04R 1/026
See application file for complete search history.

(56) References Cited

U.S. PATENT DOCUMENTS 6,993,145 B2 * 1/2006 Combest ................ H04R 1/023 381/189
8,712,091 B2 * 4/2014 Taylor .................... H04R 1/023 381/345
9,014,411 B2 * 4/2015 Rodgers ................ H04R 1/023 381/391

(Continued)

FOREIGN PATENT DOCUMENTS

JP 7-131876 A 5/1995
JP 10-243488 A 9/1998
JP 2014-143468 A 8/2014

OTHER PUBLICATIONS

Japanese-language Office Action issued in Japanese Application No. 2019-236813 dated Jul. 4, 2023 with English translation (8 pages).

(Continued)

*Primary Examiner* — Dedei K Hammond
*Assistant Examiner* — Joseph James Peter Illicete
(74) *Attorney, Agent, or Firm* — Crowell & Moring LLP

(57) ABSTRACT

A speaker grill includes a diffusion plate, a base, and a support portion. The diffusion plate forms an opening facing in a sound-emitting direction of a speaker and that is arranged on an outer side of the opening. The base supports the diffusion plate at an outer circumference thereof. The support portion is provided at a front surface of the diffusion plate in the sound-emitting direction, having a support surface that covers at least a portion of the front surface of the diffusion plate, and having a plurality of partition walls forming slits in the sound-emitting direction. The support surface forms a virtual surface covers an outer surface of the base.

10 Claims, 6 Drawing Sheets

(56) References Cited

U.S. PATENT DOCUMENTS

| | | | | |
|---|---|---|---|---|
| 9,088,842 | B2 * | 7/2015 | Silverstein | H04R 1/02 |
| 10,499,132 | B1 * | 12/2019 | Gao | H04R 7/16 |
| 10,841,675 | B2 * | 11/2020 | Howard | H04R 1/025 |
| 2021/0027776 | A1 | 1/2021 | Wodrich et al. | |

OTHER PUBLICATIONS

Notice of Allowance issued in U.S. Appl. No. 17/125,421 (10 pages), Sep. 24, 2021.

* cited by examiner

SPEAKER GRILL AND SPEAKER DEVICE

This application is a continuation of U.S. patent application Ser. No. 17/125,421, filed Dec. 17, 2020, which claims priority from Japanese Patent Application No. 2019-236813 filed on Dec. 26, 2019, the disclosures of which are expressly incorporated by reference herein.

BACKGROUND

The present disclosure relates to a speaker grill and a speaker device.

CROSS REFERENCE TO RELATED APPLICATION

Priority is claimed on Japanese Patent Application No. 2019-236813, filed Dec. 26, 2019, the contents of which are incorporated herein by reference.

DESCRIPTION OF RELATED ART

Others have disclosed a speaker device having a housing capable of accommodating a speaker inside. In such speaker device, a part of the frame of the housing is covered with a cloth-like covering material.

When a speaker grill with irregularities on the outer surface is covered with a cloth body, the unevenness on the outer surface of the speaker grill may give rise to irregularities on the surface of the cloth body, making it difficult to realize the desired design. In order to realize the desired design, it is necessary to provide a support portion for the cloth body on the speaker grill. In this case, since the sound emitting hole of the speaker is blocked by the support portion, there is a drawback of the sound quality being deteriorated.

SUMMARY

The present disclosure has been achieved in view of the above circumstances, and has as its object to provide a speaker grill and a speaker device that prevent deterioration of sound quality while maintaining a designed shape.

The speaker grill of one aspect of the present disclosure is provided with a diffusion plate that forms an opening facing a speaker and that is arranged on the outer side of the opening so as to form a concave shape in the sound-emitting direction of the speaker; a base that supports the diffusion plate at the outer circumference thereof; and a support portion that is provided at the front surface of the diffusion plate in the sound-emitting direction, having a support surface that covers at least a portion of the front surface of the diffusion plate, and having a plurality of partition walls forming slits in the sound-emitting direction; in which the support surface forms a virtual surface that covers the outer surface of the base.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION

Figure 1:
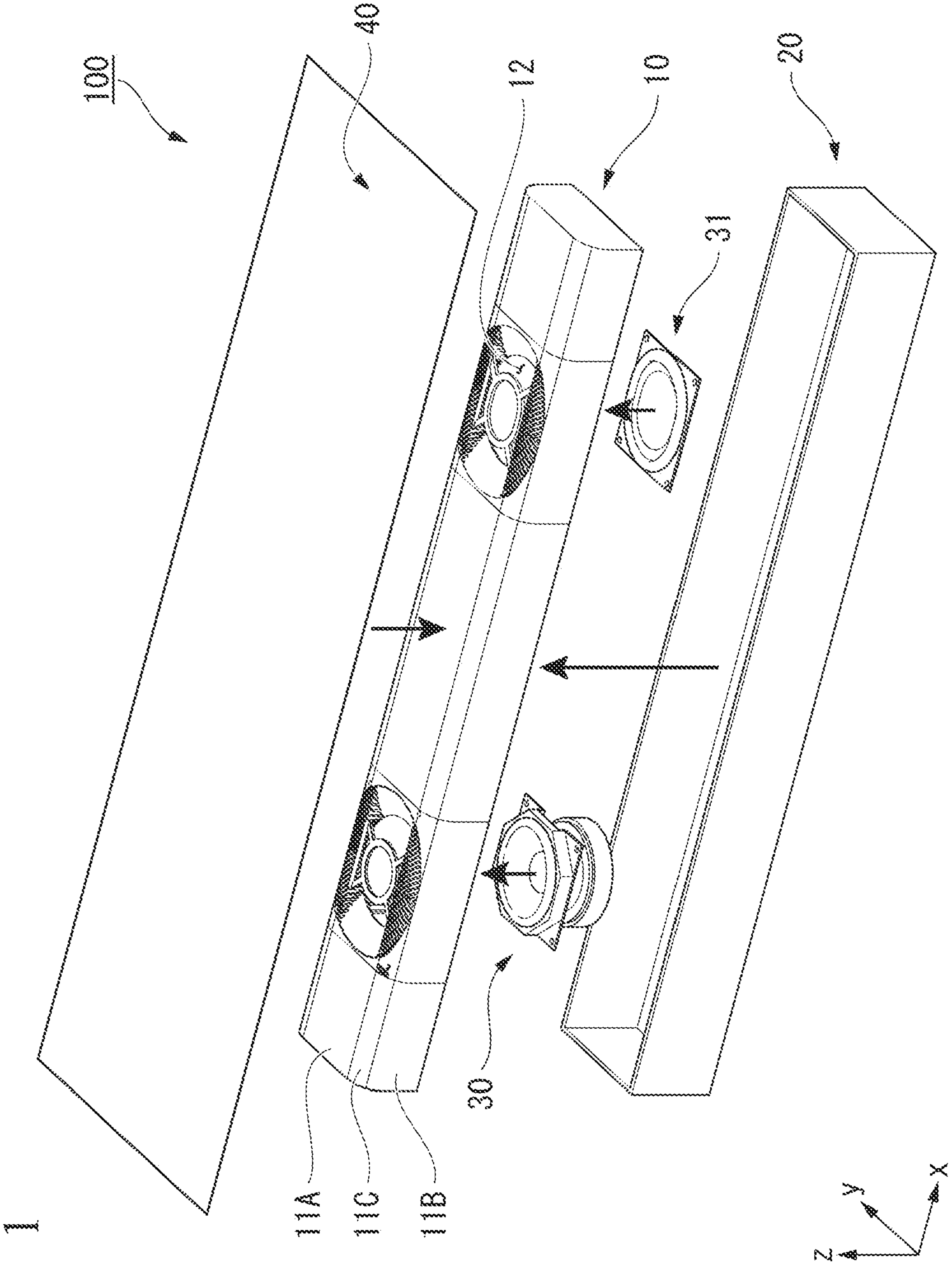
FIG. 1 is a perspective view showing an inventive speaker device.

Hereinbelow, embodiments will be described in detail while referring to the drawings as appropriate.

In the drawings used in the following description, in order to make the features easy to understand, there are cases in which portions that are characteristic features of the present disclosure are depicted in an enlarged manner for the sake of convenience, and so the dimensional ratios and the like of the respective constituent elements may not always be the same as the actual values. Furthermore, materials, dimensions and the like in the following description are mere exemplary examples, and the present disclosure is not limited thereto. Various modifications may be appropriately made in a range not departing from the gist thereof.

FIG. 1 is a perspective view of a speaker device 100 according to an embodiment. The speaker device 100 is provided with a speaker grill 10, a housing 20, a speaker 30, a passive radiator 31, and a cloth body 40. The speaker device 100 is, for example, a sound bar speaker.

Hereinbelow, the bottom plate of the speaker device 100 is defined as the xy plane, with the major axis direction of the speaker device 100 being the x direction, and the minor axis direction of the speaker device 100 that is orthogonal to the x direction being the y direction. Further, the direction orthogonal to both the x direction and the y direction is defined as the z direction. The central axis and the sound emitting direction of the speaker 30 and the passive radiator 31 are in the z direction. The x direction is an example of a first direction, and the y direction is an example of a second direction.

The speaker grill 10 is a lid of the housing 20. By fitting together the speaker grill 10 and the housing 20, a space is formed inside. The speaker 30 and the passive radiator 31 are housed in the internal space. The cloth body 40 covers the speaker grill 10. While FIG. 1 illustrates a state before the cloth body 40 covers the speaker grill 10, after the cloth body 40 covers the speaker grill 10, the cloth body 40 comes into close contact with the outer surface of the speaker grill 10. The cloth body 40 may be any as long as it has flexibility and allows sound to pass through. The cloth body 40 is, for example, a woven fabric, a knitted fabric, or a non-woven fabric. The cloth body 40 may also be a foam sheet or the like.

Figure 2:
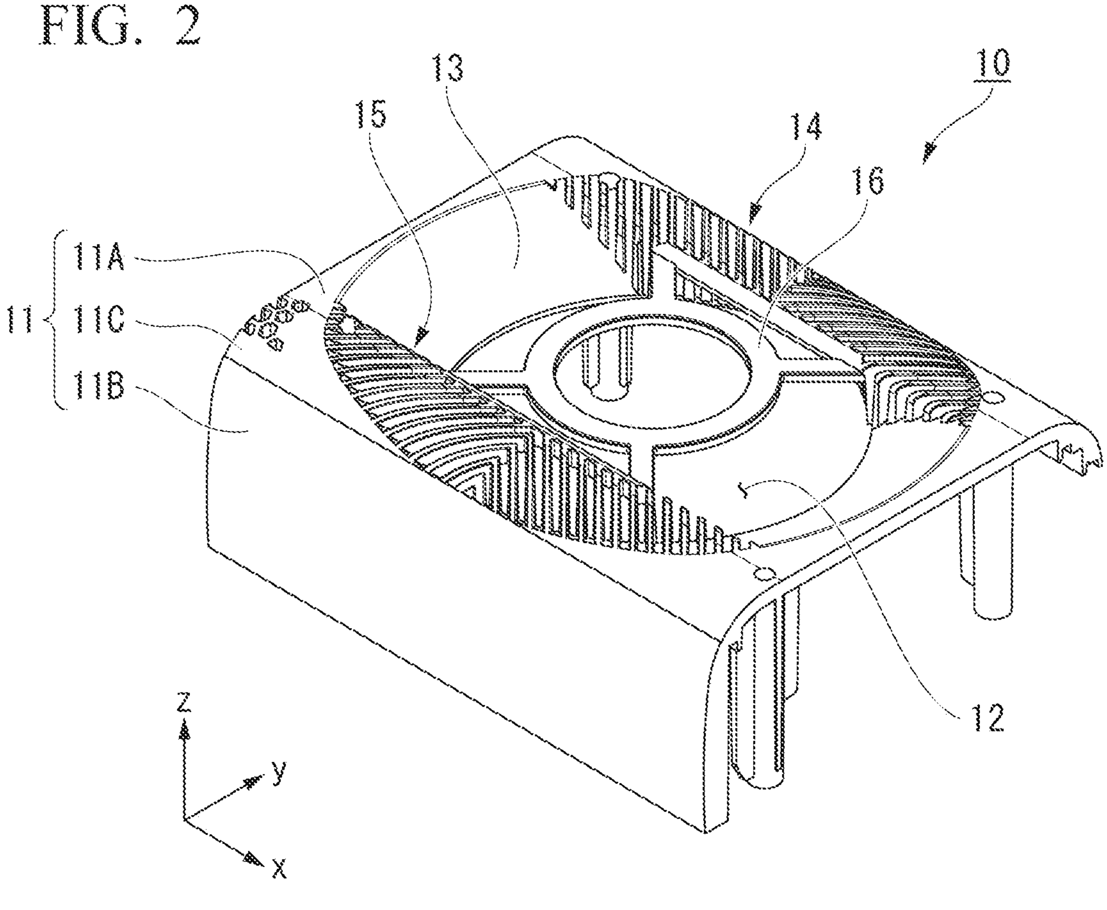
FIG. 2 is a perspective view showing a speaker grill.

FIG. 2 is an enlarged perspective view of the speaker grill 10. The speaker grill 10 is provided with a base 11, a diffusion plate 13, a first support portion 14, a second support portion 15, and a protection portion 16.

The base 11 is provided with a flat plate 11A, a side plate 11B, and a curved plate 11C. The flat plate 11A is a flat plate parallel to the xy plane. The flat plate 11A extends in the x direction, for example. The side plate 11B is a plate that intersects the xy plane. The side plate 11B also extends in the x direction, for example. The side plate 11B may have an opening through which sound from the speaker 30 passes.

The curved plate 11C is a portion connecting the flat plate 11A and the side plate 11B. The upper surface of the base 11 is composed of, for example, the flat plate 11A and the curved plate 11C.

The base 11 has an opening 12. The opening 12 is on the upper surface of the base 11. The opening 12 straddles, for example, the flat plate 11A and the curved plate 11C. The opening 12 is a passage for sound emitted from the speaker 30 and the passive radiator 31. The opening 12 is, for example, above the vibrating surfaces of the speaker 30 and the passive radiator 31. For example, as shown in FIG. 1, the speaker 30 and the passive radiator 31 are in the z direction.

The diffusion plate 13 is outside the opening 12 and surrounds the periphery of the opening 12. The diffusion plate 13 is connected to the base 11 on the outer circumference. The diffusion plate 13 spreads from the opening 12 in the z direction. The outer diameter of the diffusion plate 13 increases as the distance from the opening 12 increases. The diffusion plate 13, for example, is curved. The diffusion plate 13 is curved in a bowl shape from the outer surface of the base 11, for example. That is, the diffusion plate 13 is arranged outside the opening 12 so as to have a concave shape in the sound-emitting direction of the speaker 30. The diffusion plate 13 diffuses the sound emitted from the speaker 30.

Figure 3:
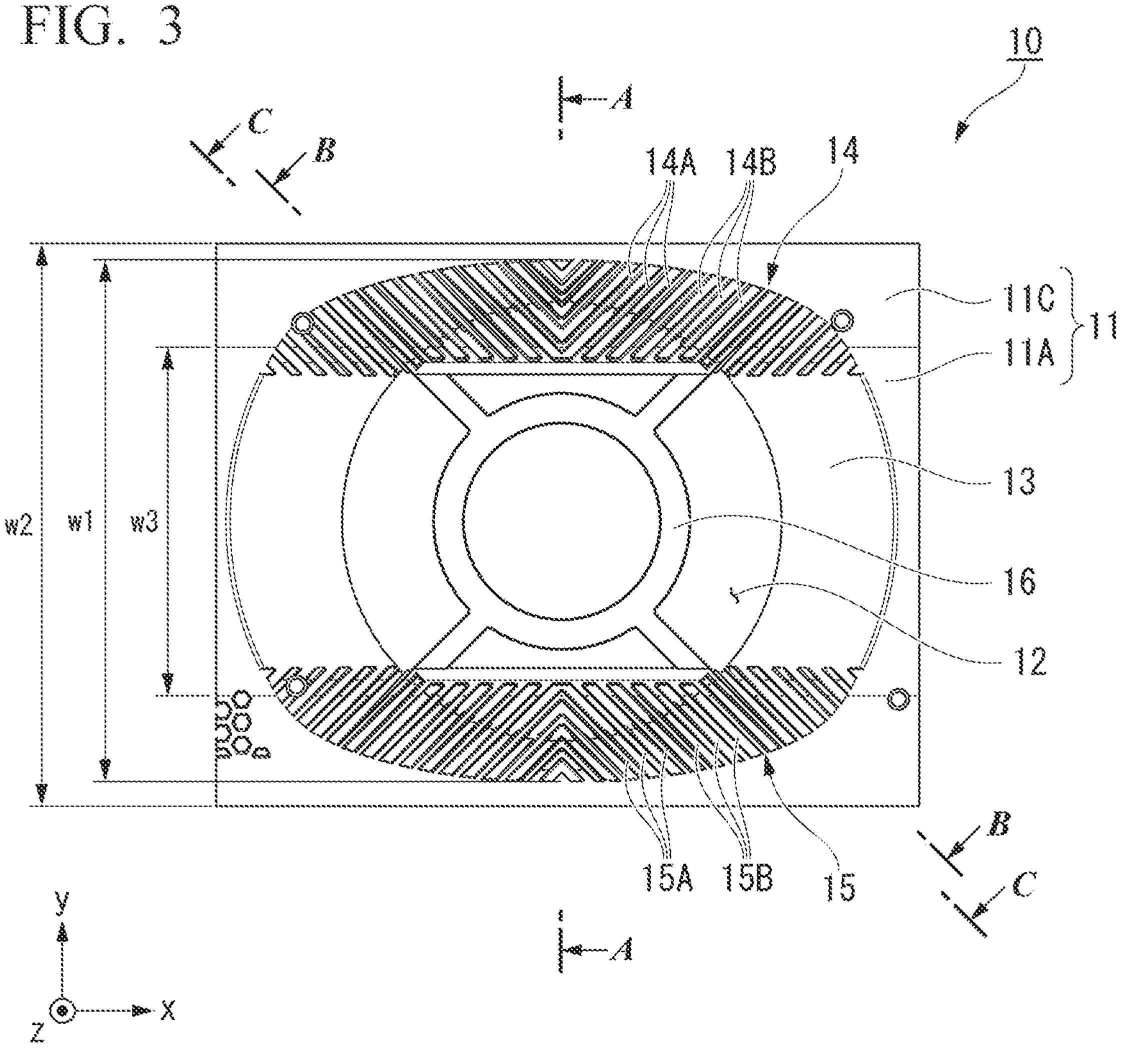
FIG. 3 is a plan view showing the speaker grill.

FIG. 3 is an enlarged plan view of the characteristic portion of the speaker grill 10. The width w1 of the diffusion plate 13 in the y direction substantially coincides with the width w2 of the base 11 in the y direction, for example. For example, the width w1 of the diffusion plate 13 in the y direction is, for example, 90% or more of the width w2 of the base 11 in they direction. The width w1 of the base 11 in the y direction is the width in the y direction of the flat plate 11A and the curved plate 11C seen from the z direction. The width w1 of the diffusion plate 13 in the y direction is larger than, for example, the width w3 of the flat plate 11A of the base 11 in the y direction. By enlarging the diffusion plate 13, the sound emitted from the speaker 30 spreads.

The first support portion 14 and the second support portion 15 are support portions for supporting the cloth body 40. The first support portion 14 and the second support portion 15 prevent the cloth body 40 from sinking in at the locations where the opening 12 and the diffusion plate 13 are located, and ensure that the appearance of the cloth body 40 after fitting is kept in the designed shape. The first support portion 14 and the second support portion 15 are located, for example, at positions sandwiching the opening 12.

Figure 4:
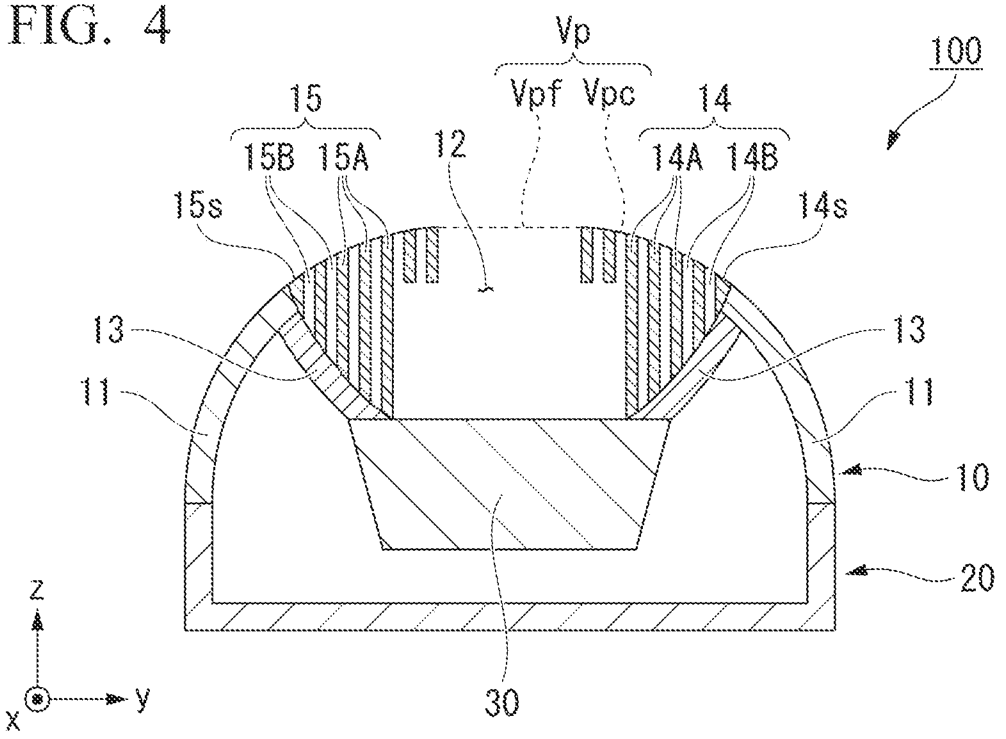
FIG. 4 is a cross-sectional view showing a cross section of the speaker device along line A-A in FIG. 3.
Figure 5:
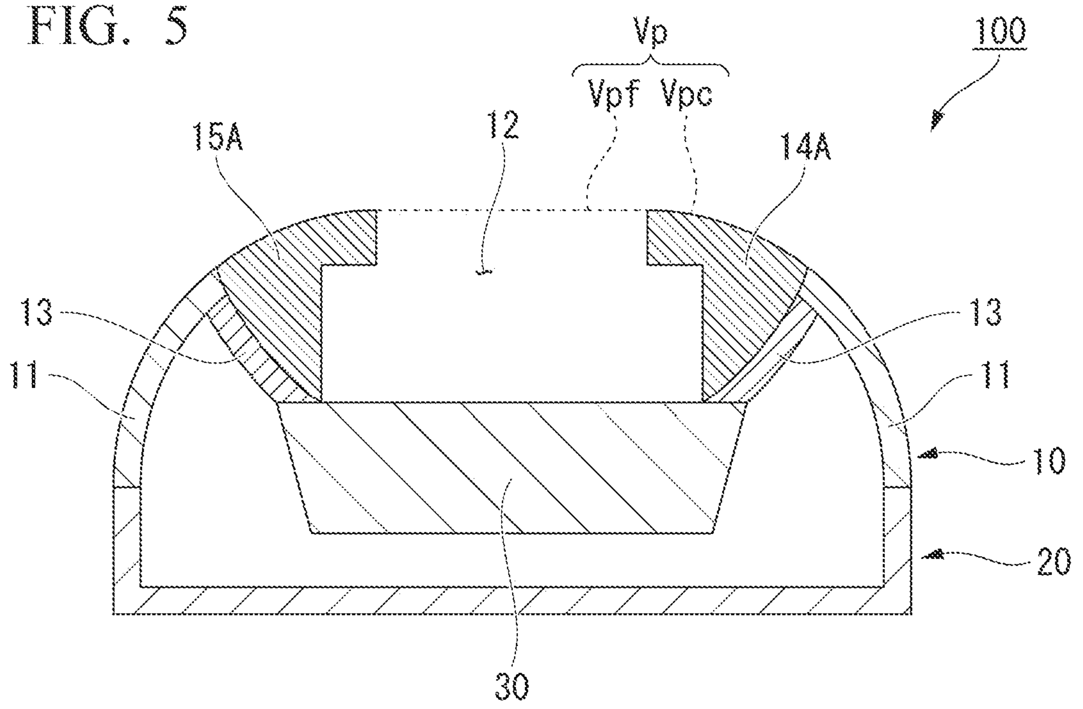
FIG. 5 is a cross-sectional view showing a cross section of the speaker device along line B-B in FIG. 3.
Figure 6:
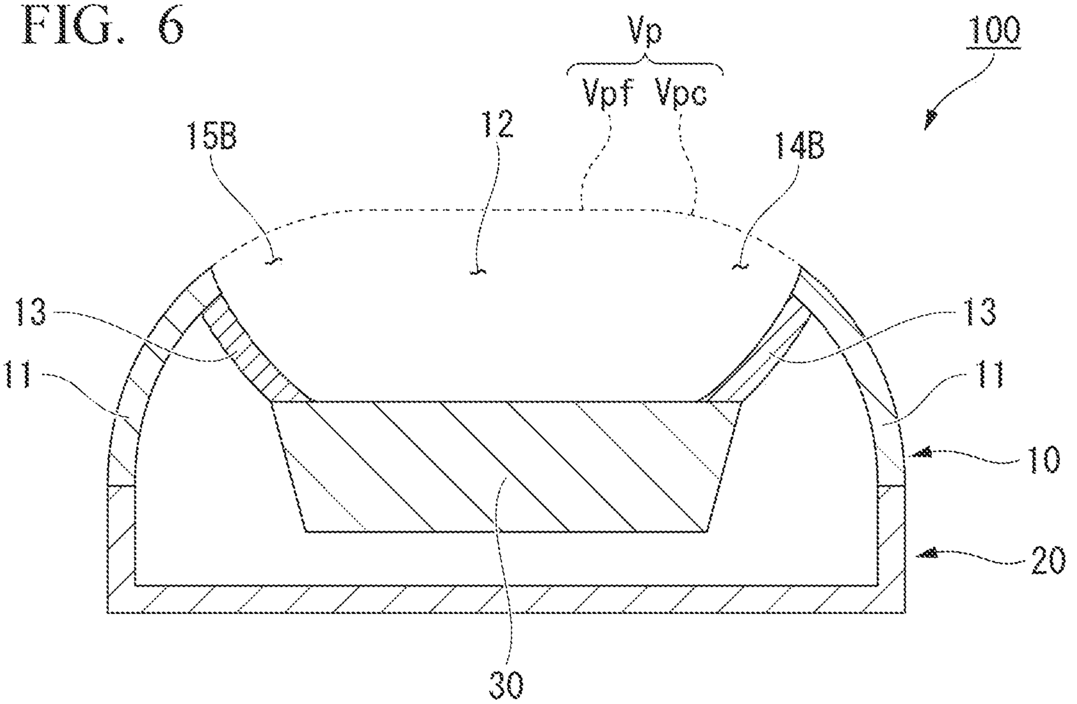
FIG. 6 is a cross-sectional view showing a cross-section of the speaker device along line C-C in FIG. 3.

FIGS. 4 to 6 are cross-sectional views of the speaker device. FIG. 4 is a cross-sectional view cut along line A-A in FIG. 3. FIG. 5 is a cross-sectional view cut along line B-B in FIG. 3. FIG. 6 is a cross-sectional view cut along line C-C in FIG. 3. Line A-A line is a line parallel to the y direction and passing through the center of the opening 12. Line B-B is a line passing through partition walls 14A and 15A described later. Line C-C is a line along slits 14B and 15B described later.

The first support portion 14 and the second support portion 15 are respectively composed of partition walls 14A and 15A that rise up from the diffusion plate 13. Slits 14B extending in the z direction are formed between adjacent partition walls 14A. Similarly, slits 15B extending in the z direction are formed between adjacent partition walls 15A. The first support portion 14 and the second support portion 15 support the cloth body 40 on the outer surfaces of the plurality of partition walls 14A and 15A in the z direction. A support surface 14*s* of the first support portion 14 is a surface connecting the outer surfaces of the plurality of partition walls 14A in the z direction. Similarly, a support surface 15*s* of the second support portion 15 is a surface connecting the outer surfaces of the plurality of partition walls 15A in the z direction. Sound emitting holes are formed in the support surfaces 14*s* and 15*s* by the slits 14B and 15B, respectively.

The support surfaces 14*s* and 15*s* are along a virtual surface Vp. The virtual surface Vp is a surface that forms the outer surface of the base 11, and is a surface that is covered by the cloth body 40 covering the speaker grill 10. The virtual surface Vp coincides with the outer surface of the base 11 at, for example, a portion having no opening 12. The virtual surface Vp is composed of, for example, a flat surface Vpf and a curved surface Vpc. The flat surface Vpf is located at a position where the flat plate 11A of the base material 11 is extended in the x direction. The curved surface Vpc is located at a position where the curved plate 11C of the base material 11 is extended in the x direction. The support surfaces 14*s* and 15*s* extend to the flat surface Vpf along the curved surface Vpc. A part of the support surfaces 14*s* and 15*s* is curved, and the curvature of the curved part of the support surfaces 14*s* and 15*s* matches, for example, the curvature of the curved surface Vpc. The curvature of the curved surface Vpc coincides with the curvature of the surface of the curved plate 11C.

The partition walls 14A and 15A and the slits 14B and 15B shown in FIG. 3 are inclined by 45° with respect to the x direction and the y direction. The partition walls 14A and 15A and the slits 14B and 15B extend, for example, along the mesh direction of the cloth body 40. The extending directions of the partition walls 14A and 15A and the slits 14B and 15B coincide with, for example, the extending directions of the fibers of the cloth body 40. When the extending directions of the partition walls 14A and 15A and the extending directions of the fibers of the cloth body 40 coincide with each other, unevenness that may slightly arise on the surface of the cloth body 40 by the partition walls 14A and 15A becomes inconspicuous, and the design is enhanced.

The protection portion 16 is provided between the first support portion 14 and the second support portion 15 so as to connect them. The protection portion 16 is located in the sound-emitting direction of the opening 12 in plan view from the z direction. The protection portion 16 protects the speaker 30 from the outside. The protection portion 16 shown in FIG. 3 includes an annular portion and a cross-linked portion connecting the annular portion with the first support portion 14 and the second support portion 15. By providing the annular portion at a position overlapping the opening 12, it is possible to prevent the protection portion 16 from obstructing the propagation of the sound emitted from the speaker 30.

The speaker grill 10 can be integrally processed by molding with a mold, a 3D printer, or the like. The base 11, the diffusion plate 13, the first support portion 14, the second support portion 15, and the protection portion 16 are, for example, integrated. When integrated, a deterioration in the appearance due to steps generated at connection portions and the generation of noise at the connection portions are prevented. In addition, the integration of these members leads to an improvement in productivity and a reduction in production cost.

In the speaker device 100 according to the present embodiment, the cloth body 40 is supported by the first support portion 14 and the second support portion 15, whereby it is possible to suppress sinking of the cloth body 40 at portions where the opening 12 and the diffusion plate

13 are located. That is, since the cloth body 40 can be made to conform to a designed shape, the speaker device 100 according to the present embodiment has a high degree of versatility in various designs.

Further, since the first support portion 14 and the second support portion 15 have gaps due to the slits 14B and 15B in the support surfaces 14*s* and 15*s*, the sound emitted from the speaker 30 through the gaps and the sound diffused by the diffusion plate 13 can be transmitted to the outside.

Further, the support surfaces 14*s* and 15*s* that support the cloth body 40 are formed by the first support portion 14 and the second support portion 15 regardless of the shape of the diffusion plate 13. In other words, the degree of freedom in the shape and size of the diffusion plate 13 is increased. For example, by increasing the size of the diffusion plate 13, the sound emitted from the speaker 30 is transmitted to the outside with higher quality.

Further, by matching the shapes of the first support portion 14 and the second support portion 15 with the direction of the fibers of the cloth body 40, unevenness generated on the surface of the cloth body 40 by the partition walls 14A and 15A can be made inconspicuous.

Figure 7:
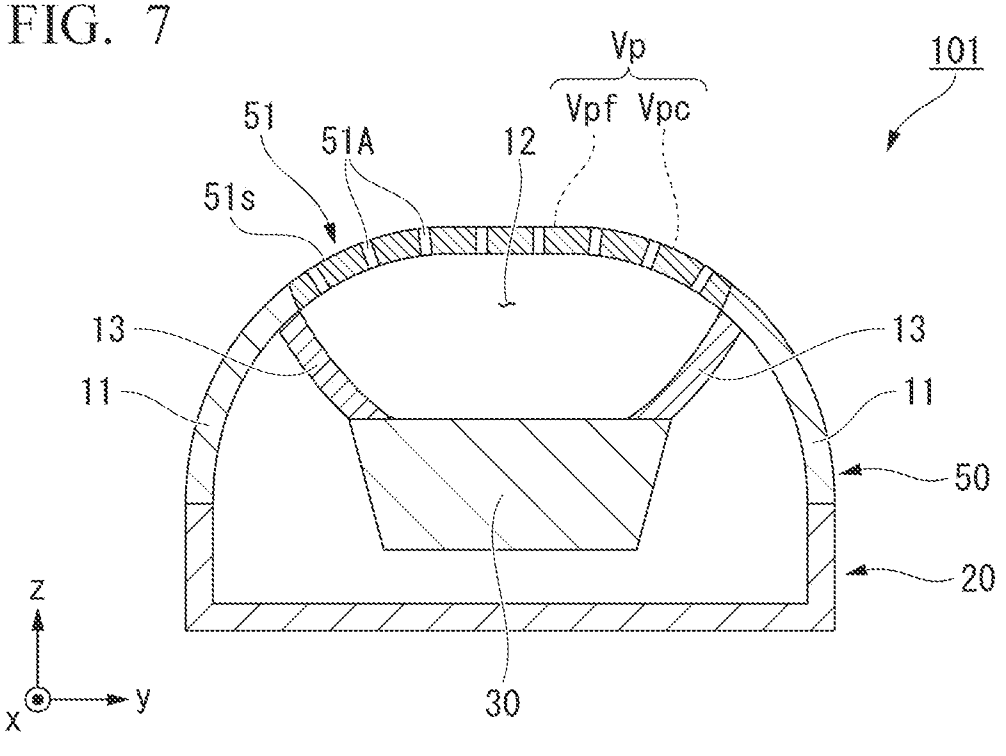
FIG. 7 is a cross-sectional view showing another inventive speaker grill.

FIG. 7 is a cross-sectional view of a speaker device 101 according to another embodiment. FIG. 7 shows a cross section along a plane parallel to the y direction and passing through the center of the opening 12. The speaker device 101 shown in FIG. 7 differs from the speaker device 100 according to the previous embodiment in that a speaker grill 50 has a support portion 51 instead of the first support portion 14 and the second support portion 15. In the speaker device 101 according to the present embodiment, the same components as those of the speaker device 100 according to the previous embodiment are denoted by the same reference numerals, and descriptions thereof will be omitted.

The speaker grill 50 is provided with the base 11, the diffusion plate 13, and the support portion 51. The support portion 51 is connected to the base 11 and covers the upper part of an opening 12 and the diffusion plate 13. The support portion 51 supports the cloth body 40 with a support surface 51*s* on the outer surface thereof. The support surface 51*s* is along the virtual surface Vp. The virtual surface Vp coincides with, for example, the outer surfaces of the base 11 and the support portion 51. The virtual surface Vp is composed of, for example, the flat surface Vpf and the curved surface Vpc.

The support portion 51 is integrated with, for example, the base 11 and the diffusion plate 13. The support portion 51 also serves as a protection portion for the speaker 30.

The support portion 51 has holes 51A. The shape of each hole 51A is not particularly limited. The holes 51A may be, for example, slits extending in one direction or a circular hole.

The speaker device 101 according to the present embodiment can prevent the cloth body 40 from sinking inward from the opening 12 by supporting the cloth body 40 with the support portion 51. Further, since the support portion 51 has holes 51A, the sound emitted from the speaker 30 can be transmitted to the outside through the holes 51A. Further, since the support surface 51*s* that supports the cloth body 40 does not depend on the shape of the diffusion plate 13, the size of the diffusion plate 13 can be freely designed.

Figure 8:
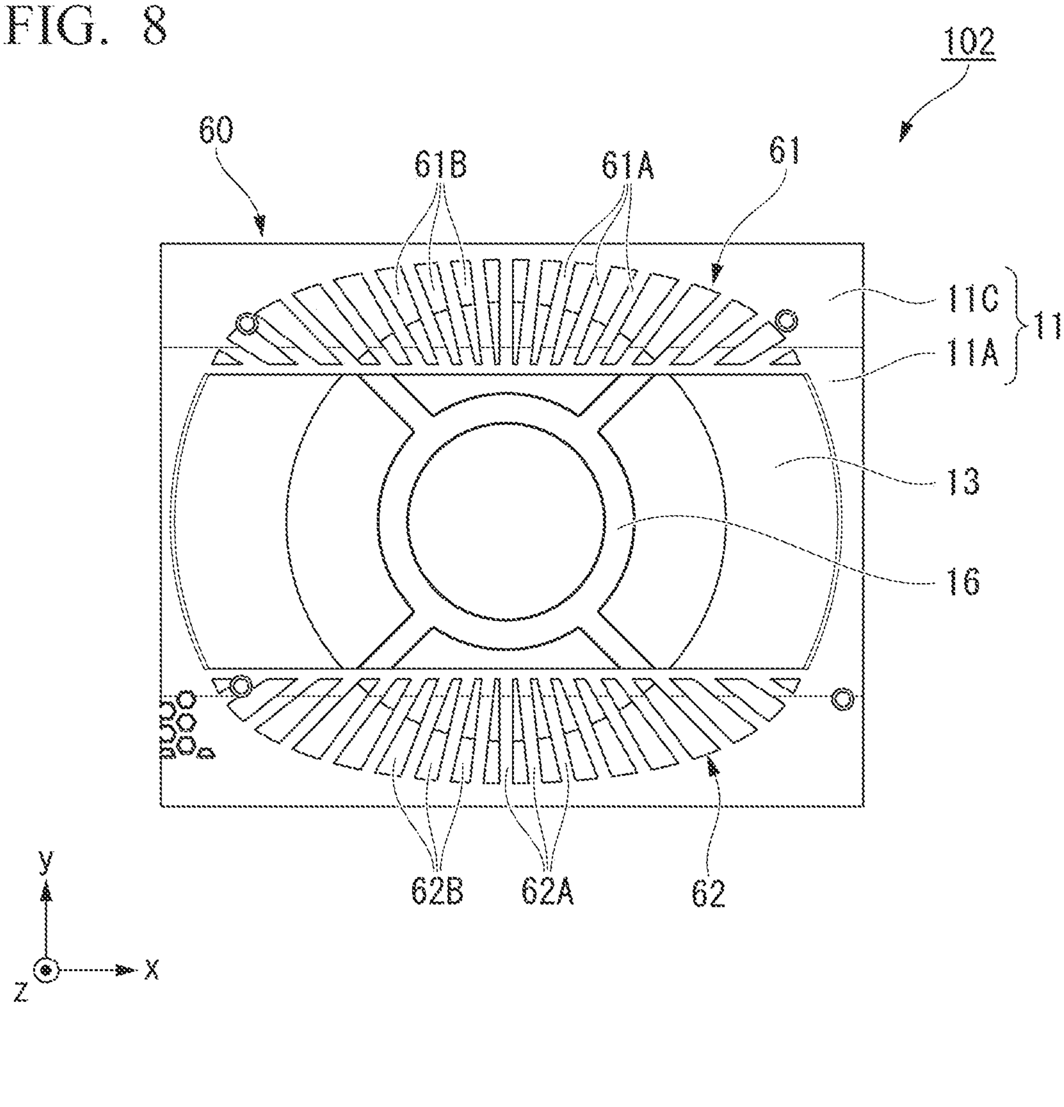
FIG. 8 is a plan view showing another inventive speaker grill.

FIG. 8 is a plan view of a speaker device 102 according to another embodiment from the z direction. In the speaker device 102 shown in FIG. 8, the shapes of a first support portion 61 and a second support portion 62 of a speaker grill 60 are different from those of the speaker device 100 according to the previous embodiment. In the speaker device 102 according to the present embodiment, the same components as those of the speaker device 100 according to the previous embodiment are denoted by the same reference numerals, and descriptions thereof will be omitted.

The speaker grill 60 is provided with the base 11, the diffusion plate 13, the first support portion 61, the second support portion 62, and a protection portion 16. The first support portion 61 and the second support portion 62 are support portions that support the cloth body 40.

The first support portion 61 and the second support portion 62 are respectively composed of partition walls 61A and 62A rising up from the diffusion plate 13. There are slits 61B and 62B between the adjacent partition walls 61A and 62A, respectively. The support surfaces of the first support portion 61 and the second support portion 62 have holes at positions corresponding to the slits 61B and 62B.

The first support portion 61 and the second support portion 62 differ from the first support portion 14 and the second support portion 15 according to the previous embodiment only in the shapes of the partition walls 61A and 62A, with other configurations being the same. The partition walls 61A and the partition walls 62A are oriented so as to radiate from the center of the opening 12. The slits 61B and 62B also extend radially from the center of the opening 12. The sound is isotropically spread from the speaker 30 installed below the opening 12. By arranging the partition walls 61A and 62A radially from the center of the opening 12, blockage of the propagating sound by the partition walls 61A and 62A can be further suppressed.

In the speaker device 102 according to the present embodiment, the cloth body 40 is supported by the first support portion 61 and the second support portion 62, whereby sinking in of the cloth body 40 at the portions where the opening 12 and the diffusion plate 13 are located can be inhibited. Since the first support portion 61 and the second support portion 62 have the slits 61B and 62B, the sound emitted from the speaker 30 can be transmitted to the outside through the slits 61B and 62B. Further, since the support surface supporting the cloth body 40 does not depend on the shape of the diffusion plate 13, the size of the diffusion plate 13 can be freely designed.

While preferred embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

For example, the outer shape of the speaker grill is not limited to that shown in FIG. 1. Since the support surface of the support portion follows the outer surface of the speaker grill, sinking in of the cloth body at the speaker opening and the diffusion plate is avoided, and the shape of the speaker grill can be freely designed. When the outer surface of the speaker grill has a plurality of irregularities, by for example attaching the cloth body with adhesion at the portion with the irregularities, it is possible to have the cloth body serve as a cover along the outer surface of the speaker grill.

Further, the speaker device according to the above embodiment can be applied to a speaker of a product with a built-in speaker, a speaker of a baffle-less speaker product, or an opening of a bass reflex port. Products with built-in speakers include, for example, TV speakers, ceiling speakers, in-vehicle speakers, built-in interior speakers, and portable keyboards. Baffle-less speaker products include, for example, desktop audio, sound bars, hi-fi products and the like.

According to the above embodiments, it is possible to prevent deterioration of the sound quality of a speaker while maintaining the designed shape.

What is claimed is:

1. A speaker grill comprising:
a diffusion plate that forms an opening facing in a sound-emitting direction of a speaker and that is arranged on an outer side of the opening as shaped parts of a side of an elliptical truncated cone;
a base that supports the diffusion plate at an outer circumference thereof; and
a support portion that is provided at a front surface of the diffusion plate in the sound-emitting direction, having a support surface that covers at least a portion of the front surface of the diffusion plate, and having a plurality of partition walls forming slits in the sound-emitting direction, wherein
the support surface forms a virtual surface that covers an outer surface of the base.

2. The speaker grill according to claim 1, wherein
the base has a flat plate extending in a first direction and a curved plate connected to the flat plate in a second direction that is orthogonal to the first direction;
the virtual surface has a flat surface and a curved surface along the outer surface of the base; and
the support surface extends along the curved surface to the flat surface.

3. The speaker grill according to claim 1, wherein
the support portion comprises a plurality of partition walls rising from the diffusion plate.

4. The speaker grill according to claim 1, wherein
the diffusion plate, the base, and the support portion are integrally formed.

5. The speaker grill according to claim 1, wherein
the base has a flat plate extending in a first direction and a curved plate connected to the flat plate in a second direction that is orthogonal to the first direction; and
a width of the diffusion plate in the second direction is greater than a width of the flat plate in the second direction.

6. The speaker grill according to claim 1, wherein
the base has a flat plate extending in a first direction and a curved plate connected to the flat plate in a second direction that is orthogonal to the first direction; and
a width of the diffusion plate in the second direction is 90% or more of a width of the base in the second direction.

7. The speaker grill according to claim 1, further comprising: a protection portion that covers at least a part of the opening.

8. The speaker grill according to claim 1, further comprising: a cloth body that covers the outer surface of the base and the support surface of the support portion.

9. The speaker grill according to claim 8, wherein a direction in which the fibers constituting the cloth body extend coincides with a direction in which the slits extend.

10. A speaker device comprising:
a speaker; and
a speaker grill covering the speaker, the speaker grill including:
a diffusion plate that forms an opening facing in a sound-emitting direction of the speaker and that is arranged on an outer side of the opening as shaped parts of a side of an elliptical truncated cone;
a base that supports the diffusion plate at an outer circumference thereof; and
a support portion that is provided at a front surface of the diffusion plate in a sound-emitting direction, having a support surface that covers at least a portion of the front surface of the diffusion plate, and having a plurality of partition walls forming slits in the sound-emitting direction, wherein
the support surface forms a virtual surface that covers the outer surface of the base.

* * * * *